Aug. 27, 1957  C. T. BREWER  2,804,559
HOUSING FOR MOTOR OR OTHER APPARATUS
Filed Jan. 29, 1952  5 Sheets-Sheet 1
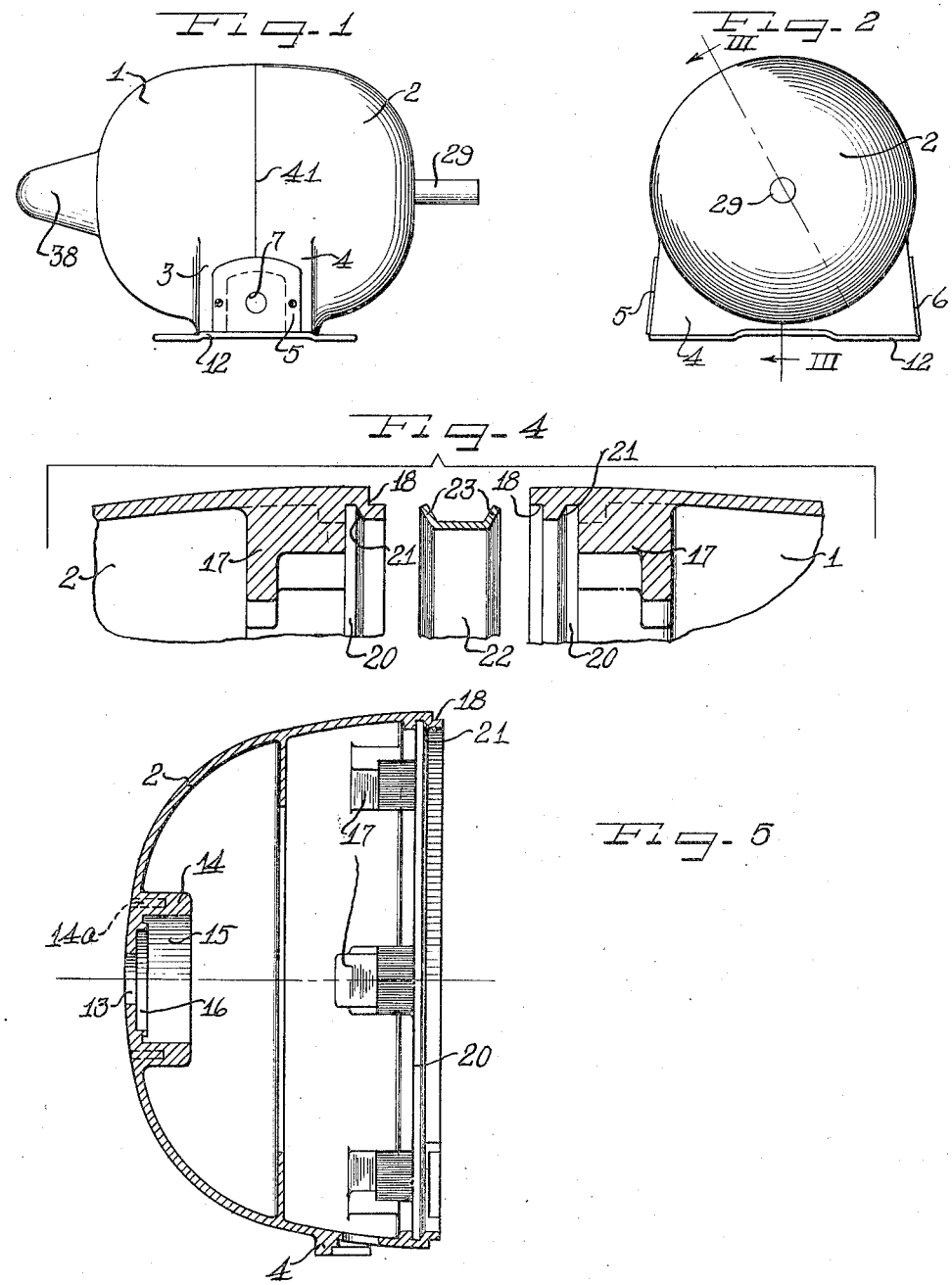
Inventor
Clarence T. Brewer Aug. 27, 1957 C. T. BREWER 2,804,559
HOUSING FOR MOTOR OR OTHER APPARATUS
Filed Jan. 29, 1952 5 Sheets-Sheet 2
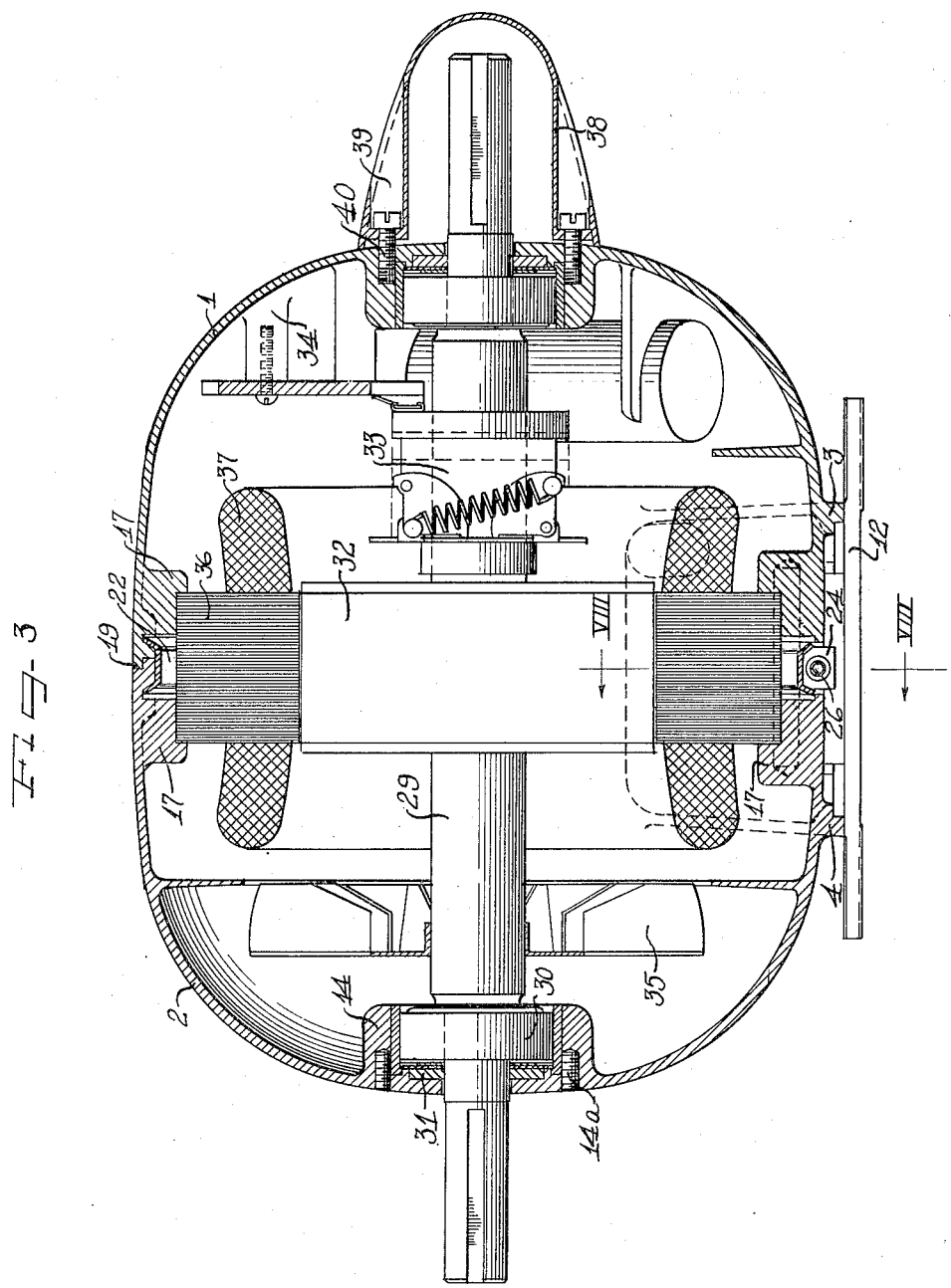
Inventor
Clarence T. Brewer

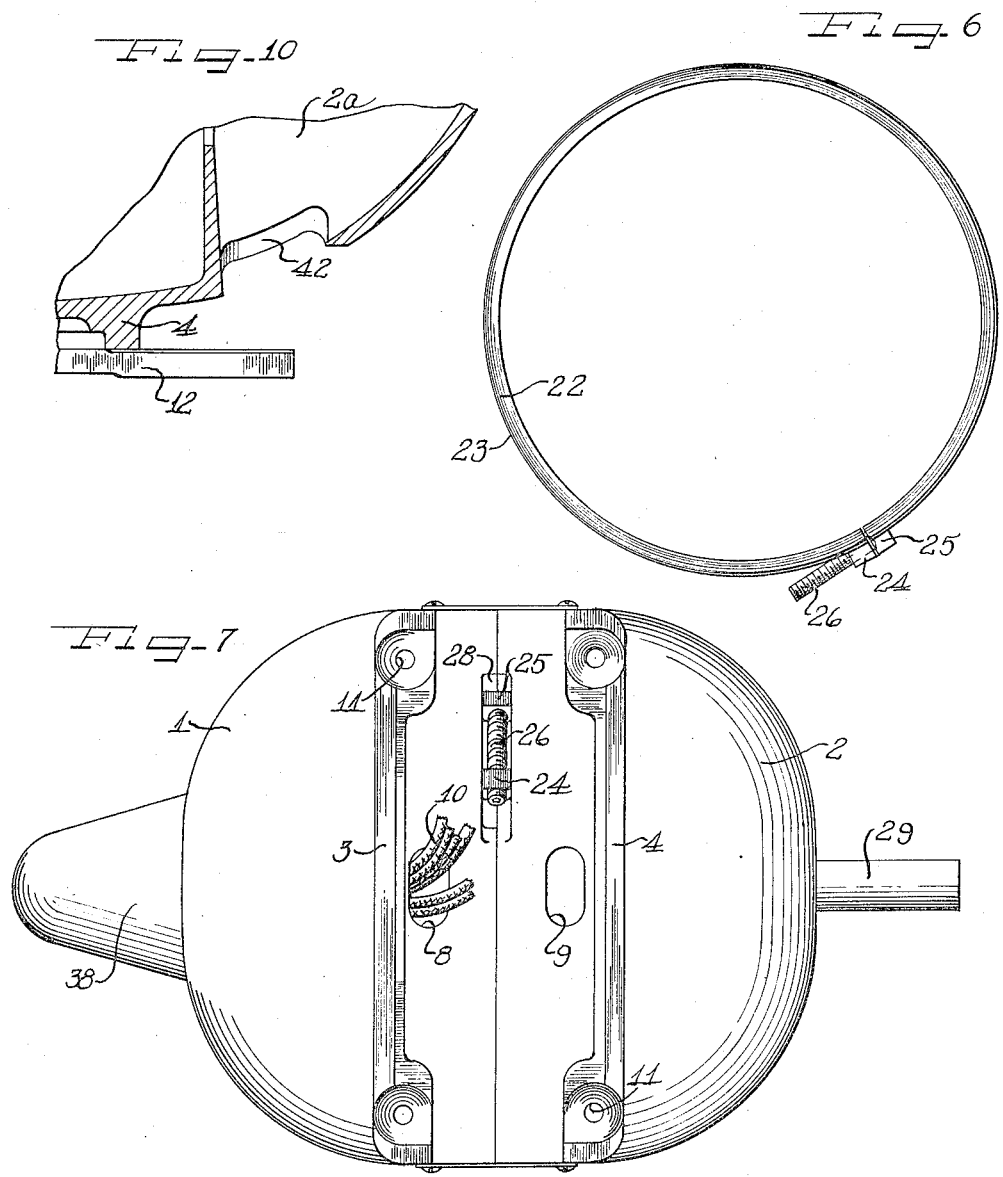

Aug. 27, 1957 C. T. BREWER 2,804,559
HOUSING FOR MOTOR OR OTHER APPARATUS
Filed Jan. 29, 1952 5 Sheets-Sheet 4
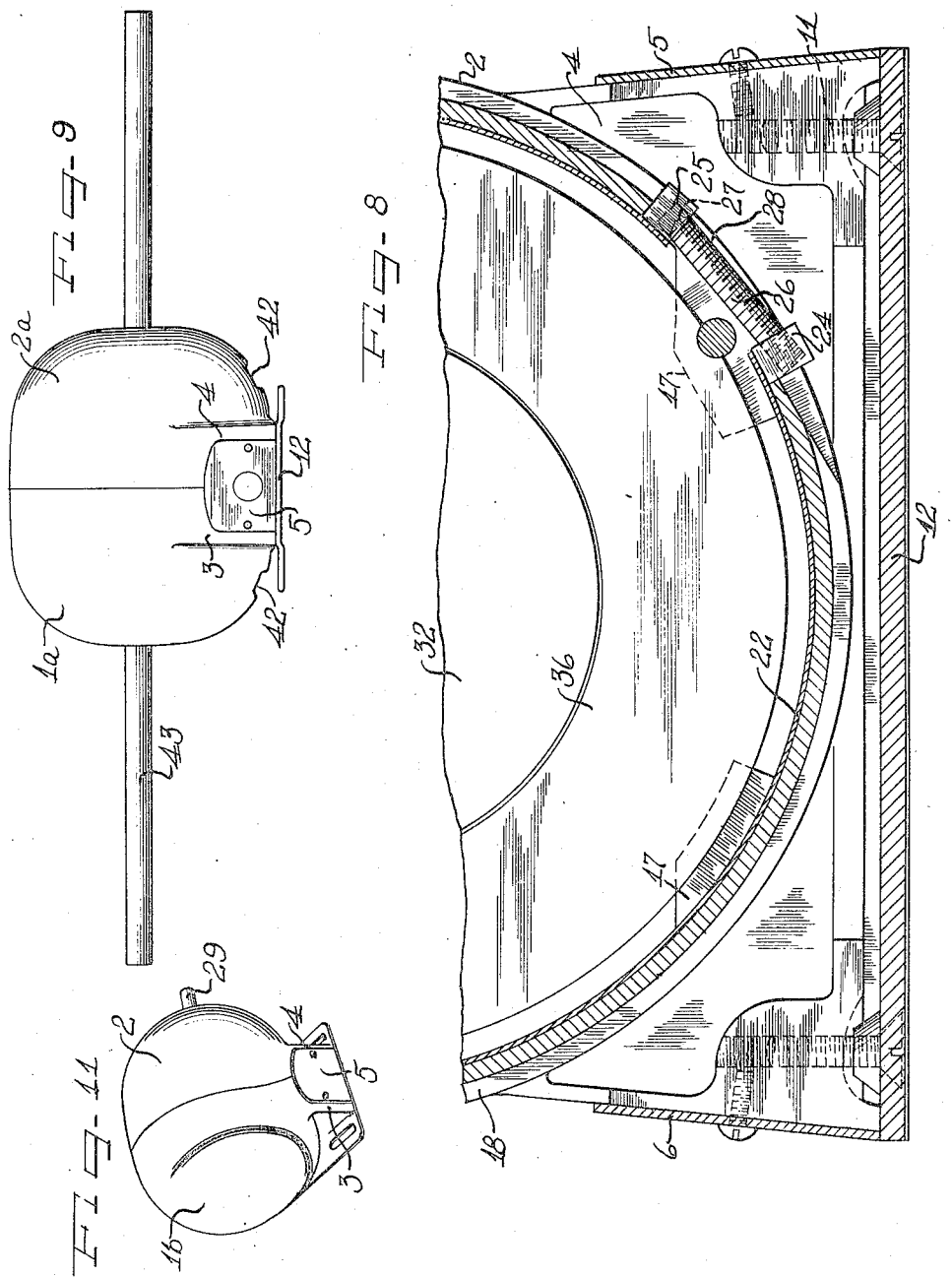
Inventor
Clarence T. Brewer

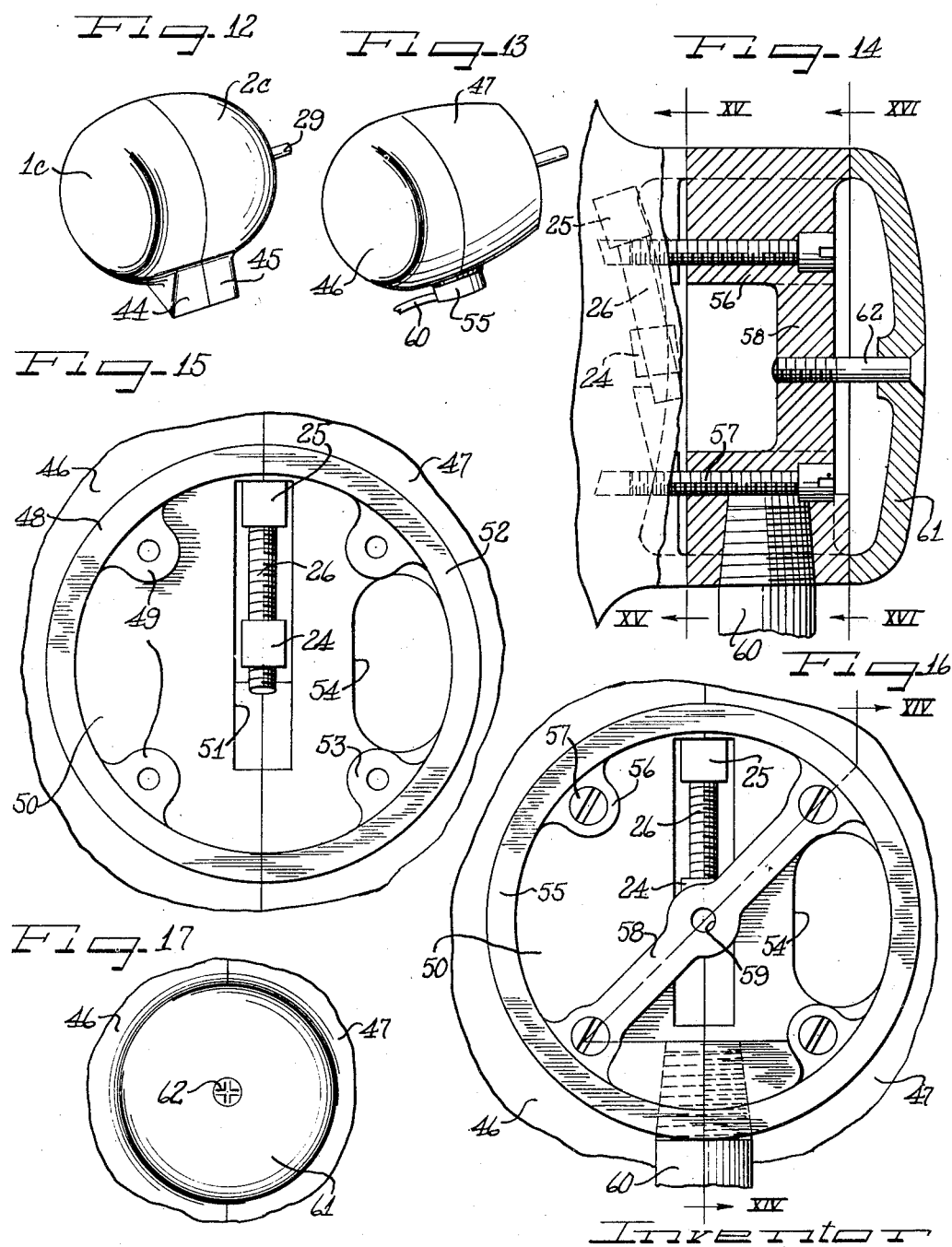

United States Patent Office 2,804,559
Patented Aug. 27, 1957

2,804,559

HOUSING FOR MOTOR OR OTHER APPARATUS

Clarence T. Brewer, Oak Park, Ill.

Application January 29, 1952, Serial No. 268,701

12 Claims. (Cl. 310—254)

This invention relates to improvements in a housing for a motor and other apparatus, the housing being suitable and desirable for enclosing an electric motor, a dynamotor, gears, speed reducing or increasing arrangements, transmissions, and other apparatus requiring tight and substantially complete enclosing as will be apparent to one skilled in the art.

In the past, many housings for motors and other apparatus have been developed, but in most cases were subject to objectionable expense in manufacture owing to many parts requiring fixtures, dies, special tools and machining operations. Such housings also employed the use of through bolts that were unsightly in appearance and the housings were not sanitary in that they possessed projecting nuts, recessed or projecting spot faces for bolt heads, nuts, etc., substantially impossible to clean and wherein bacteria could readily develop. Further, formerly known devices of this kind, when used for electric motors, necessitated machining and grinding of laminations which form a part of the housing with the resultant risk of the tolerances increasing all in one direction, frequently caused the acquisition of bad electrical characteristics and noise by virtue of a non-uniform air gap due to different degrees of tightening of the through bolts, did not provide enclosures for terminal connections and switches, and also enclosures for means locking the housing sections together, and in many cases could not be used with a stator removable from the housing.

With the foregoing in mind, it is an important object of this invention to provide a housing of the character set forth herein which may be made to completely enclose its contents, or provide air holes for ventilation, and conduit as desired, without additional cost.

Also an object of this invention is the provision of a housing for a motor or other apparatus involving no through bolts, but presenting a clean, smooth external surface, free of cracks and crevices that cannot be cleaned and in which bacteria may accumulate or develop, and which may be thoroughly hosed with no danger of injury to the contents.

Another object of the invention resides in the provision of a housing of the character set forth herein which embodies a pair of complemental shells held tightly together by a circumferentially engaging ring or clamp, thus requiring only one single connecting medium.

It is also a feature of the invention to provide a housing of the character set forth herein, embodying a pair of complemental shells held together by a single circumferential ring or clamp, the housing shells having shoulders therein and the ring being so arranged that, when tightened, it cams or wedges the housing shells together.

A further feature of the invention resides in the provision of a housing of the character set forth herein comprising a pair of complemental shells having interior sloping shoulders, with an expanding ring or clamp located inside the shells and which, when expanded, holds the shells tightly together, no other joining means being required.

Another desideratum of the instant invention is the provision of a motor housing or the like designed to completely enclose its contents, and the base of which provides a box for terminal connections and the like.

Also an object of the invention resides in the provision of a motor housing or the like, which is highly economical to manufacture, in that each shell of the housing is faced, shaft hole bored, the bearing seats machined, etc., all in one setting with wide tolerances wherein one tolerance does not greatly affect the other.

Also a feature of the invention resides in the provision of a housing for a motor so constructed that the stator laminations may be used as they come from a punch press, these laminations being clamped between flanges of the component parts of the housing, and removable and replaceable since they are separate from the housing.

It is also a feature of the invention to provide a motor housing or the like wherein the motor fan may discharge air out the fan end of the housing, or out the end of the housing through which the shaft projects, to avoid the possibility of pulling dirt from the pulley end of the shaft into the housing.

Still a further feature of the invention resides in the provision of a housing for a motor or other apparatus involving two complemental shells, held tightly together by a single securing means, the operable portion of which is concealed within the mounting base of the housing or electrical connection box, but readily accessible when that base or electrical connection box cover is removed from its support.

Also a feature of this invention is the provision of a housing for a motor or other apparatus which may be flange mounted and which embodies a smooth readily removable conduit box enclosing the electrical connections between a source of electricity and the windings inside the housing in the event it contains a motor.

Still another object of the invention resides in the provision of a completely enclosed and externally smooth motor housing having the contact box thereon which may readily be adjusted so that the main conduit may be brought into the housing from any of a plurality of directions.

While some of the more salient features, characteristics and advantages of the instant invention have been above pointed out, others will become apparent from the following disclosures, taken in conjunction with the accompanying drawings, in which—

Figure 1 is a side elevational view of an electric motor and housing therefor embodying principles of the instant invention;

Figure 2 is an end elevational view of the motor and housing taken from the right-hand side of Fig. 1;

Figure 3 is an enlarged central vertical sectional view taken substantially as indicated by the staggered section line III—III of Fig. 2, looking in the direction of the arrows;

Figure 4 is an enlarged fragmentary vertical exploded sectional view, illustrating the parts in the upper central portion of Fig. 3 separated;

Figure 5 is a central vertical sectional view of the left-hand housing shell as viewed in Fig. 3, sans motor parts;

Figure 6 is a side elevational view of the housing connecting ring in normal or contracted position prior to its introduction into the housing;

Figure 7 is a bottom plan view of the motor and housing, with the sub-base removed, taken from the underside of Fig. 1, but enlarged;

Figure 8 is an enlarged fragmentary transverse vertical sectional view through the lower part of the motor and housing taken substantially as indicated by the line VIII—VIII of Fig. 3;

Figure 9 is a side elevational view of a motor and housing of slightly different construction, but embodying principles of the instant invention;

Figure 10 is a fragmentary vertical sectional view through the lower right-hand portion of the housing only of Fig. 9;

Figure 11 is a pictorial illustration of a motor and housing of still different form, but embodying principles of the instant invention;

Figure 12 is a pictorial illustration of a housing for a motor or other apparatus of slightly different form than that seen in Fig. 11;

Figure 13 is a pictorial illustration of a flange mounted housing including a contact box;

Figure 14 is a greatly enlarged fragmentary part elevational, part sectional view taken on a staggered section line XIV—XIV of Fig. 16, and illustrating the interior of the contact box and its mounting on the motor housing;

Figure 15 is a bottom plan view of the base of the motor with the contact box removed, taken as indicated by the line XV—XV of Fig. 14, looking in the direction of the arrows;

Figure 16 is a fragmentary view similar to Fig. 15 with the contact box in place but with the cover thereof removed, and taken substantially as indicated by the line XVI—XVI of Fig. 14; and Figure 17 is a bottom plan view of the contact box and adjacent housing surface with the cover of the contact box in position.

As shown on the drawings:

The illustrated embodiment of the instant invention is shown in conjunction with an electric motor by way of example and as a method of better presenting the advantages of the invention. While three different types of motor housings are illustrated in the drawings, the principles of construction are the same for each. In Figs. 1 to 8, inclusive, a motor is shown wherein one end of the shaft is normally used for driving some piece of apparatus, but wherein the other end of the shaft may selectively be used as well if so desired. In Figs. 9 and 10 there is illustrated a motor having ventilating openings in the housing, and wherein the shaft extends through both ends of the housing for a relatively great distance, such type of motor being highly desirable for use in polishing the inside of tubular elements. In Fig. 11 I have illustrated in general a form of housing wherein it is impossible to utilize both ends of a motor shaft, one end being entirely closed off. Outside of the provision of the ventilating openings, which same openings may be provided in any of the styles illustrated, if so desired, and outside of the provision of holes through which the shaft may extend, the construction of all of the housings is substantially the same.

In the first illustrated embodiment of the invention, seen in Figs. 1 to 8, inclusive, there is shown a motor housing embodying a pair of complemental substantially allochiral shells 1 and 2 which are preferably castings, and can be satisfactorily cast of aluminum or an equivalent light-weight metal although substantially any suitable material may be used. Each of the shells 1 and 2 has substantially half a base portion thereon which consists of a hollow boss, 3 on shell 1, 4 on shell 2, molded integral with the underside of each shell. These bosses have complemental openings therein through the end walls, so that the two shells form one opening into the base portion of the housing at each end thereof, these openings being closed by suitable end caps 5 and 6, either of which may be provided with a suitable aperture 7 as seen in Fig. 1 to accommodate a conductor, if so desired. The end caps are removable so that terminal switch boxes, and the like, may be readily attached to the base portion of the housing if so desired.

In most instances, however, the end caps will be solid so as to completely seal the base portion of the housing except for the bottom thereof, and conductors leading to the motor, may pass through suitable openings 8 and 9 in the underside of the shells inside the base portion, as seen clearly in Fig. 7, such conductors being indicated by numeral 10. The base portions 3 and 4 are further provided with tapped bolt holes 11 by means of which a separate sub base plate 12 may be attached to the housing. The sub base plate 12 is not a necessity, since the housing may readily be attached to any foundation or support in similar manner. Frequently it is expedient and also desirable to utilize the plate 12 and then attach this plate in turn to some suitable support when top mounting is required.

In any event, when the conductors are passed through the openings in the bottom of the shells, it will be noted that these openings are completely sealed when the motor is mounted on a base.

With reference now more particularly to Figs. 3 and 5, it will be seen that each shell is provided centrally of the closed end with a shaft opening 13 around which is an inwardly extending hollow boss 14 machined to provide a bearing seat 15 and a gasket seat 16. Through the end of the shell tapped openings 14a may be provided to secure a cap over the projecting end of a shaft, if so desired and as more fully later explained. Adjacent the open end thereof, each shell is provided with a plurality of spaced and shouldered stator supporting lugs 17, there being six such lugs in the illustrated example.

Around the open end thereof, each shell is provided with a contact face 18 complemental to that of the other shell, these contact faces being shouldered to provide a simple form of scarf or rabbeted joint indicated at 19 in Fig. 3 when the shells are connected. Adjacent the rabbeted contact face 18, each shell is provided with an annular groove 20 having a downwardly and outwardly beveled or sloping face 21 on the open end side of the groove 20, as clearly seen in Fig. 4.

One of the most important features of the instant invention is the unitary element with its single operating member by means of which the two shells are firmly and positively connected together. This element consists of an expansible ring 22 shown in elevation in Fig. 6, and seen in section in Figs. 3 and 4. The ring is constructed of spring metal, and normally and inherently tends to assume the contracted position seen in Fig. 6 with the ends thereof disposed closely together. In other words, the ring is split and tends to assume a position with its ends together so that the ring is of minimum diameter. With reference now to Fig. 4 it will be seen that the ring is generally channel-shape in cross section, with the channel opening to the outside of a ring, and with the channel defining walls 23 inclined outwardly at an angle in keeping with the angularity of the faces 21 at the outer side to the channels 20 in the respective shells.

Looking now at Figs. 6, 7 and 8, it will be seen that the ends of the ring 22 are provided with outstanding lugs 24 and 25. The lug 24 is threaded to accommodate a socket head screw 26, while the lug 25 is merely recessed as at 27 (Fig. 8) in which the free end of the screw 26 abuts, engages or seats.

With the ring contracted, or as seen in Fig. 6, it is placed inside one shell, with a flange 23 seated in the groove 20 of the shell. The lugs 24 and 25 extend through a half slot 28 formed in the bottom of the shell as seen in Figs. 7 and 8. The other shell is then placed over the first shell with the contact faces 18 in close engagement, and the other shell is obviously equipped with a similar half slot 28. Then, the socket head screw 26 is turned inwardly to press the lugs 24 and 25 apart to the position seen in Figs. 7 and 8, thus expanding the ring inside the housing shells into positive engagement with the outer faces 21 of the grooves 20. The ring will obviously expand substantially uniformly, and by virtue of the sloping faces 21 in the shells and the slanted sides or flanges 23 on the ring, the shells will be cammed into exceedingly tight engagement with each other. Only one single element is necessary to adjust and connect the shells, namely the screw 26. It will also be noted that this screw and the flanges 24 and 25 are effectively concealed within the hollow base, when the housing is mounted on the sub base 12 or some other foundation. In order to separate the shells, it is a simple expedient to rotate the screw 26 in the opposite direction, permitting the ring 22 to contract.

In Figs. 3 and 8 I have illustrated the housing mounted around the parts of an electric motor. The motor parts include a shaft 29 extending through both ends of the shell, and each end of the shaft is journaled in a ball bearing element 30 in the respective bearing seat 15 and a gasket 31 in the seat 16 seals off the projecting end of the shaft. Centrally thereof the shaft carries a suitable rotor 32 and any form of switch 33 to automatically transfer from a starting to a running winding may be associated with the shaft. Such switch may be mounted or connected with any suitable support such as bosses 34 formed integrally in one of the shells. The shaft also carries a fan 35 which moves air toward the left as seen in Fig. 3, and which of course is for cooling purposes.

A stator 36 formed of punched laminations which may be welded together at the outside to form a unit is carried between the aforesaid stator holding lugs 17—17 in the shells. The stator is, of course, provided with a suitable winding 37.

Since it may be desired to use only one projecting end of the shaft 29, the end adjacent the fan would be the preferable, so that the fan would not tend to draw dirt from the pulley end of the shaft into the motor. The other end of the shaft may be encased in a suitable cap 38 having opposed streamlined recesses 39 for a pair of bolts 40 engageable in the aforesaid tapped holes 14a in the end of the shell. Obviously, if for any reason it should become necessary, the cap may be removed and mounted over the opposite end of the shaft, as is clearly apparent from the showing in Fig. 3.

Now, in view of the foregoing, it will be seen that the entire motor and the housing may be constructed extremely economically and operate more efficiently than motors heretofore known. This results, in one instance, by virtue of the fact that no regrinding of the center bore of the stator laminations is necessary, these laminations being used just as they come from the punch press. These laminations are held firmly between the flanges 17 in the housing shells and cannot become out of alignment or cause a variation in the air gap between the stator and the rotor, because of the way each shell is formed. Only three operations on each shell are necessary after the casting of the shell. The base portion is milled off. The drilling and tapping of the mounting holes 11 in the base portion is a single operation. The third operation occurs on a lathe, where the contact face of the shell is machined, the ring groove 20 is cut, and the bearing and gasket seat 15 and 16 are machined at the same time and on the one device. Therefore there can be no misalignment of bearings as heretofore frequently resulting from the overtightening of one bolt in a motor housing embodying through bolts. For these and other obvious reasons, the construction of the housing and the motor is more economical than heretofore possible.

Further, it will be especially noted that the motor may be completely housed and enclosed, and when the housing has been put together around the motor, there is only a single minute crack 41, Fig. 1, to tell where the housing has been joined. When the housing is painted or otherwise decorated, this crack is virtually invisible. Obviously the motor is in a clean and sanitary condition so that it readily may be used in dairies and similar locations where sanitation is a prime requisite, and the motor may be washed by hosing without fear of damaging the motor. Further, the housing has an exceedingly pleasing appearance with both shells being of dome-like character, and there are no cracks or crevices or places difficult to clean and in which bacteria may develop.

Now it will be understood that the housing shells might be joined together by an external ring by putting annular shoulders on the exterior of the housing shells, but an inside ring or band is stronger than an outside band, because with an inside band the metal would have to be compressed or buckling would have to result in order to reduce the diameter of the ring and permit the spreading or separating of the housing shells. Therefore, the inside ring is preferable.

In some cases where washing down of the motor housing is not necessary, it is desirable to provide ventilation for the motor in order to augment the cooling thereof. With this in mind, in Figs. 9 and 10 I have illustrated a form of housing, substantially identical with that above described and embodying a pair of complemental shells 1a and 2a, in each of which an opening is provided on the underside as indicated at 42. Air may enter through one of the openings and exit through the other opening adjacent the fan. By way of illustration in Fig. 9 I have also illustrated a motor equipped with an elongated shaft 43 which projects a rather great distance through both ends of the housing so that both ends of the shaft may be used for work. Such an arrangement is extremely desirable when it is desired to grind or polish the inside of tubular elements. Now, of course, it will be understood that such ventilation openings 42 may be provided with the housing shown in Figs. 1 to 8, inclusive, if so desired.

In Fig. 11, I have illustrated a housing for a motor wherein only one end of the shaft will ever be used. In this instance, two complemental shells 1b and 2 are provided, the shell 2 being the same as described in connection with Figs. 1 to 8 inclusive. The shell 1b is the same as shell 1, but with the shaft opening 13 eliminated, and the shaft 29 will be shortened sufficiently to ride in the bearings but not project through the shell. Such an arrangement is the absolute in sealing in of the motor, and sanitation.

In Fig. 12, I have illustrated a slightly different form of housing for a motor or other apparatus, which corresponds in general to the structure of Fig. 11, but wherein two complemental shells 1c and 2c are provided which extend smoothly into complemental mating portions or bosses 44 and 45. In this instance, there are no end caps 5 and 6 associated with the hollow base, but all conductors are brought up through the platform upon which the motor base is mounted. Such construction is even more sanitary than the arrangement seen in Figs. 1 and 11 wherein the caps 5 and 6 are utilized.

In Fig. 13 I have disclosed a flange mounted motor housing equipped with a conduit box on one side thereof. This housing includes a pair of shells 46 and 47, the shell 46 being of the same general character as the shell 1c of Fig. 12, but having only a short semi-circular flange 48 on the bottom. This flange carries an inwardly projecting pair of spaced bosses 49 having internally threaded openings for the reception of conduit box bolts. The portion of the housing inside the flange is bottomed as indicated at 50, and is provided with half an opening at 51 through which access is obtained to the internal ring or clamp adjusting screw 26.

The shell 47 has a similar formation on the underside thereof having a short semi-circular flange 52, a pair of spaced internally threaded bosses 53, and a half opening complemental to the half opening 51 so that access may be had to the clamp adjusting screw 26. This shell also has an opening in the bottom at 54 through which conductors may extend from the motor windings inside the shell.

As seen in Fig. 13, the shell 47 may have a substantially flat external face or outboard face through which the motor shaft projects, and it will be understood that an exterior or interior fan may be associated with motor in any desired manner.

With reference more particularly to Figs. 14 and 15, it will be seen that the conduit box consists of a cylindrical part 55 having a plurality of bosses 56 therein, four being illustrated, to accommodate securing bolts 57 which engage in the bosses 49 and 53 on the housing element. Two of the bosses 56 are interconnected by a cross bar 58 having a threaded aperture 59 therein. On one side thereof, the box is provided with a suitable threaded opening to accommodate an electrical conduit 60. It will be noted that the conduit 60 may be disposed in any desirable position, that is enter the conduit box 55 from any one of four different directions. To accomplish that, it is simply necessary to position the box on the housing base with the conduit opening to whatever side may be desired.

A simple form of rounded cover 61 may be attached to the box by a simple socket head bolt 62 entering the threaded aperture 59 in the yoke or cross member 58 of the box. It will be noted that only minute seams appear where the box is connected to the housing base and where the cover is connected to the box, and these seams would be substantially invisible if the box were painted. The seams are not great enough to invite a growth of bacteria therein and may be thoroughly cleansed by hosing the box, or in any other suitable manner.

It will be understood that modifications and variations may be effected without departing from the scope of the novel concepts of the present invention.

I claim as my invention:

1. In a housing of the character described, a pair of complemental shells, complemental base portions on said shells to form a hollow base when the shells are joined, and holding means located inside said shells and completely concealed thereby to maintain the shells tightly together in abutment leaving the external surface of the joined shells smooth and uniform except for a very fine crack.

2. In a housing of the character described, a pair of complemental shells, complemental base portions on said shells to form a hollow base when the shells are joined, and holding means located inside said shells and completely concealed thereby to maintain the shells tightly together in confronting relationship, said shells having complemental openings inside said base portions through which said holding means are accessible for adjustment.

3. In a housing of the character described, a pair of complemental shells, each shell having an annular groove inside adjacent the open end thereof, a channel-shaped split ring engageable in said grooves, said split ring inherently tending to contract, a lug on each end of said split ring, and a screw threaded through one of said lugs, the other lug acting as an abutment for the end of said screw when the same is moved to expand said ring and hold the shells together, each shell having a half-slot complemental to that of the other shell in the bottom thereof, said lugs and screw projecting through the opening formed by said half-slots.

4. In a motor housing, a pair of allochiral shells generally of dome shape, each shell having a rabbeted contact face around the open end thereof, an annular series of stator supporting lugs in each shell, a bearing seat at the curvate end of each shell, each shell having a hollow base portion complemental to that of the other shell, at least one of said shells having a shaft opening in the curvate end thereof, and said shells being otherwise imperforate outside said base portions.

5. In a housing of the character described, a pair of complemental shells, complemental base portions on said shells to form a hollow base when the shells are joined, and holding means inside said shells accessible through said base to secure said shells together in abutment with each other, each shell having a ventilation opening outside said base, at least one of said shells having an opening in an end thereof for a driven shaft, and said shells being otherwise imperforate outside said base.

6. In a housing of the character described, a pair of complemental shells, an annular shoulder within each shell adjacent the open end, said shoulders diverging when the shells are joined with the open ends thereof in abutment, a split ring clamp having diverging flanges to engage said shoulders and cam the shells tightly together when expanded, said clamp having an inherent tendency to contract, and manually operable means to expand said clamp, at least one of said shells having an opening in the bottom of the housing to permit access to said means.

7. In a motor housing, a pair of complemental shells, means inside said shells to maintain them tightly joined together, said shells conjointly having a flanged opening, a conduit box attachable over said opening, and a smooth curvate cover for said box.

8. In a motor housing, a pair of complemental shells, means inside said shells to maintain them tightly joined together, said shells conjointly having a flanged opening, a conduit box attachable over said opening, a smooth curvate cover for said box, said box having a conduit opening in the side thereof, and means to connect the box to the housing with said opening in any of a plurality of directions relatively to the housing.

9. In a motor housing, a pair of complemental shells, means inside said shells to maintain them tightly joined together, said shells conjointly having an opening therein, means adjacent said opening to support a conduit box, a conduit box removably mounted over said opening, and the first said means being accessible for operation through said opening with the conduit box removed.

10. In a motor housing, a pair of complemental shells, means inside said shells to maintain them tightly joined together, said shells conjointly forming an opening with an external flange therearound, tapped bosses adjacent said flange, a conduit box shaped to seat on said flange, an equal number of apertured bosses in said conduit box, bolts joining the box to the housing in any desired angular position, and a cover for said box.

11. In a housing of the character described, a pair of shells having confronting open ends, unitary securing means to hold the shells together with the confronting ends thereof in intimate direct abutment with each other, said securing means being within said shells and concealed thereby, a single adjustable element to tighten or release said securing means, a base formation on said shells to support the housing, and at least one of said shells providing access through said base for operating said element.

12. In a housing of the character described, a pair of shells having confronting open ends, each shell having a groove therein adjacent the open end thereof, a unitary split ring having flanges for reception in said grooves inside said shells to hold the shells together with the open ends thereof in intimate direct abutment with each other, lugs on the ends of said ring, and a screw engaged with said lugs to expand or contract said ring.

References Cited in the file of this patent

UNITED STATES PATENTS

| | | |
|---|---|---|
| 783,409 | Behrend | Feb. 28, 1905 |
| 831,551 | Guttzeit | Sept. 25, 1906 |
| 1,059,048 | Hall | Apr. 15, 1913 |
| 1,137,085 | Riddle | Apr. 27, 1915 |
| 1,527,162 | Alvord | Feb. 24, 1925 |
| 1,658,043 | Eaglesfield | Feb. 7, 1928 |
| 1,738,689 | Brown | Dec. 10, 1929 |
| 1,801,124 | Teichmann | Apr. 14, 1931 |

(Other references on following page)

UNITED STATES PATENTS

| | | |
|---|---|---|
| 2,039,456 | Sammarone | May 5, 1936 |
| 2,272,625 | Spengler | Feb. 10, 1942 |
| 2,329,151 | Brady | Sept. 7, 1943 |
| 2,384,489 | Pancher | Sept. 11, 1945 |
| 2,391,115 | Anderson | Dec. 18, 1945 |
| 2,417,195 | Hargreaves | Mar. 11, 1947 |
| 2,423,750 | Benson | July 8, 1947 |
| 2,458,904 | Happe | Jan. 11, 1949 |
| 2,464,816 | Koch | Mar. 22, 1949 |
| 2,478,551 | Turner | Aug. 9, 1949 |
| 2,505,854 | Curzon | May 2, 1950 |
| 2,547,734 | Barager | Apr. 3, 1951 |
| 2,584,365 | Palffy | Feb. 5, 1952 |
| 2,627,816 | Kaatz | Feb. 10, 1953 |
| 2,648,791 | Roloson | Aug. 11, 1953 |
| 2,686,609 | Fletcher | Aug. 17, 1954 |

FOREIGN PATENTS

| | | |
|---|---|---|
| 60,436 | Netherlands | Jan. 15, 1948 |
| 831,551 | Germany | Sept. 25, 1906 |
| 414,555 | Germany | June 8, 1925 |